(12) United States Patent
Hillmann et al.

(10) Patent No.: US 7,542,889 B2
(45) Date of Patent: Jun. 2, 2009

(54) DETERMINATION OF A MODEL OF A GEOMETRY OF A METAL SHEET FORMING STAGE

(75) Inventors: Matthias Hillmann, Zurich (CH); Waldemar Kubli, Neerach (CH)

(73) Assignee: Autoform Engineering GmbH, Neerach (CH)

( * ) Notice: Subject to any disclaimer, the term of this patent is extended or adjusted under 35 U.S.C. 154(b) by 246 days.

(21) Appl. No.: 10/570,648

(22) PCT Filed: Sep. 11, 2003

(86) PCT No.: PCT/CH03/00613

§ 371 (c)(1),
(2), (4) Date: Jun. 5, 2006

(87) PCT Pub. No.: WO2005/024671

PCT Pub. Date: Mar. 17, 2005

(65) Prior Publication Data

US 2006/0293776 A1    Dec. 28, 2006

(51) Int. Cl.
*G06G 7/48*    (2006.01)
(52) U.S. Cl. .................. 703/6; 703/1; 703/2; 703/7; 700/97; 700/98
(58) Field of Classification Search .............. 703/1, 703/2, 6, 7; 700/97, 98
See application file for complete search history.

(56) References Cited

U.S. PATENT DOCUMENTS 5,561,754 A * 10/1996 Oliver et al. ............... 345/441
5,980,085 A   11/1999 Uemura et al.
6,353,768 B1 * 3/2002 Karafillis et al. ............ 700/97
7,130,708 B2 * 10/2006 Wang et al. ................ 700/111

(Continued)

FOREIGN PATENT DOCUMENTS

EP    0 902 344 A2    3/1999

OTHER PUBLICATIONS

Xu Shuqin et al., "FEM simulation and experimental research on the AlMg4.5Mn0.4 sheet blanking", 2002, Elsevier Science, pp. 338-343.*

(Continued)

*Primary Examiner*—Paul L Rodriguez
*Assistant Examiner*—Jason Proctor
(74) *Attorney, Agent, or Firm*—Rankin, Hill & Clark LLP

(57) ABSTRACT

The invention relates to a method for determining a geometrical object for modeling the geometry of a metal sheet forming stage (1) in a CAD system. According to said method, an operator is defined which links a first geometrical model with a second geometrical model. The link is associated with a method for physically modeling a treating process which transfers a forming stage (1) from a corresponding first state into a second state. When the first geometrical model is modified, the second geometrical model is automatically updated in accordance with the physical modeling concept. The physical modeling concept for forming stages is thereby integrated into the static geometrical model environment of a CAD system. The physical modeling method is a method for calculating a border line (3) of a forming stage in an initial state prior to a forming process from a geometry of the border line (3) in a resulting state after the forming process.

20 Claims, 3 Drawing Sheets

U.S. PATENT DOCUMENTS

| | | | |
|---|---|---|---|
| 7,194,338 B2 * | 3/2007 | Schlueter et al. | 700/286 |
| 7,317,963 B2 * | 1/2008 | Hu et al. | 700/165 |
| 2003/0167097 A1 | 9/2003 | Hillmann et al. | |

OTHER PUBLICATIONS

Bradley N. Maker et al., "Input Parameters for Metal Forming Simulation using LS-DYNA", 2000, Livermore Software Technology Corporation, pp. 1-10.*

Bradley N. Maker et al., "Input Parameters for Springback Simulation using LS-DYNA", 2001, Livermore Software Technology Corporation, pp. 1-11.*

Guoqun Zhao et al., "Die cavity design of near flashless forging process using FEM-based backward simulation", 2002, Elsevier Science B. V., Journal of Materials Processing Technology 121, pp. 173-181.*

You-Min Huang, et al. "An elasto-plastic finite-element simulation of successive UO-bending processes of sheet metal", 1995, Elsevier Sciences S. A., Journal of Materials Processing Technology 53, pp. 643-661.*

Lu, S.C. et al.; "Integration of CAD and FEA for Concurrent Engineering Design of Sheet Stamping"; Transactions of the American Society of Mechanical Engineers, Series B; Journal of Engineering for Industry, ASME.; Aug. 1, 1996; vol. 118, No. 3, pp. 310-317; New York, US.

* cited by examiner

DETERMINATION OF A MODEL OF A GEOMETRY OF A METAL SHEET FORMING STAGE

BACKGROUND OF THE INVENTION

The present invention lies in the field of determining and optimising processing steps on manufacture of sheet metal formed parts, for example by way of deep-drawing or stretch-forming processes. It relates to a method, to a data processing system, to a computer program and to a data carrier for determining a model of a geometry of a forming stage in a computer-aided design (CAD) system, according to the preamble of the respective independent patent claims.

Sheet metal formed parts as a rule are manufactured by way of deep-drawing. The semi-finished product, the so-called sheet metal blanks (or simply "blanks") are placed into multi-part forming tools for this purpose. The parts are formed by way of presses in which the forming tools are clamped. The parts, as a rule, are manufactured from a flat sheet metal blank via several forming stages by way of machining steps such as drawing, reshaping, setting, etc., combined with trimming steps. With regard to this process, it is the edge regions, in particular the so-called addendums which represent problem zones. With regard to the design of the tools for a forming step, amongst other things, it is the case of complementing the suitably prepared component geometry, or an intermediate geometry with multi-step processes, (hereinafter both called component geometry), by an addendum in the edge zones, such that a tool geometry arises from this, with which the predefined component geometry may be manufactured such that no failure (cracks or wrinkles) occurs and that other demands on quality, for example a limited thickness reduction, achieving a minimal stretching of the sheet metal, and restrictions with regard to manufacturing geometry are adhered to.

The dimensioning and setting of the addendums represents considerable problems today. It is not rare that several months pass before a tool functions in a satisfactory manner. It is often the case of an iterative process which entails many reject parts and a high consumption of energy and resources. The production of addendums nowadays is largely effected in a manual and in an extremely time-consuming manner by way of computer-aided design systems (CAD). Such CAD-systems model a geometry of physical bodies, in particular, thus, of formed parts in various stages of processing, and of corresponding tools. Thereby, hundreds of individual surfaces are produced and edited due to the design of curves, supporting surfaces derived from these, and their trimming. Even the creation of an addendum for a large car body part may take several weeks without further measures. This procedural manner demands the designer to have a large expert knowledge in the fields of forming technology and CAD.

As an example and in detail, one proceeds as follows:

With the development of the method plan, which means determining the forming operations, and what and in which operation one forms and cuts, nowadays, one usually proceeds as follows. A simple sequence of processing steps is shown in FIGS. 2 to 8 as a basis for the explanation. FIG. 2 shows a sheet metal part or a blank 1 in an initial condition. The sheet metal blank 1 is held between a lower die 11 and a binder 10 in FIG. 3. The lower die 11 and the binder 10 as well as other holders and tools are not drawn in the following Figs. FIG. 4 shows the sheet metal blank 1 after deep-drawing, FIG. 5 after the trimming, FIG. 6 after reshaping, FIG. 7 after flanging the flange 5 and FIG. 8 after the setting of the flange. The individual conditions of a formed part are also called forming stages.

The drawing operation is firstly designed proceeding from the component geometry present in the CAD. This usually encompasses:
  determining flange regions which are not formed in the draw stage,
  determining a drawing position which is free of undercuts,
  filling holes,
  developing the binder surface and the addendum,
  blunting/simplifying (sharp-edged) geometry details, in order to permit the deep-drawing,
  bending over/embossing individual regions in order to compensate the springback.

The addendum (and binder surface) is examined, for example by way of
  control of the cutting angles and shear angles,
  control of the size of the smallest possible blank,
  examination of the forming ability and the resulting component quality by way of a simulation method,
  determining trailing edges by way of a comparison of section lengths in individual section planes or by way of tracking material points in the simulation.

Simulation in this context is to be understood as a simulation of a forming or machining process, which takes into account the physical properties of an object. The properties of a process are likewise taken into account, such as frictions, lubrication and machining speed. For example finite element methods, finite differences, boundary elements methods or so-called meshless methods are used in the simulation.

CAD-systems, thus, model static conditions in different machining stages. Thereby, the model of each condition is produced essentially manually from the basic elements, or from another model by way of modification. In contrast to this, the simulation simulates a dynamic process, or a transition between conditions whilst taking into account and/or computing physical properties such as stresses, extensions, cutting forces, strengthening, etc. CAD-systems and simulation systems are implemented today as separate program systems. An interaction at best takes place by way of a data exchange of geometry data.

An iterative change/adaptation of the addendum is carried out should individuals of the above mentioned examination criteria not be met.

A design of the following forming operations then follows by way of evaluating:
  working directions,
  active surfaces of the reshaping tools for the finishing forming of the geometry details,
  active surfaces of the flanging/setting tools for forming the flange regions,
  trimming operations (cutting directions and trimming sequence).

From this, there results an examination of a
  feasibility of the trimming lines by way of geometric analysis; and of a
  forming ability and component quality by way of forming simulation.

Follow-up operations are determined in an analogous manner in an iterative procedure. If results criteria are not met, the geometry and/or method parameters are iterative adapted proceeding from the drawing operation.

The method plan is then present, thus the regulations as to how and in which forming steps and trimming steps the component is to be manufactured.

The design of the tool bodies, casting models, production of CNC-milling data and the manufacture of the tools is effected after the release of the method plan.

The try-out is then effected, thus, the trial and initiation of the tools. This initiation is time-consuming and expensive and may last for months. One must adapt the process parameters and the tools (e.g. enlarging radii, changing regions by way of grinding-away or welding on material etc. (small iteration loops), if the desired quality and dimensional accuracy of the components is not achieved. The methods must be adapted in the extreme case (large iteration loop). In particular the correct trimming tools, i.e. the trimming line, which after further forming leads to the dimensionally correct component edge, are iteratively determined by way of trial and error.

The number of necessary try-out loops depends mainly on the quality of the method plan, in particular on the design of the drawing operation at the beginning of the forming and thus on the addendum.

The above described procedural manner for producing and examining the addendum has the following grave disadvantages:

the unrolling of the flanges, the examination of the cutting angle, the evaluation of the smallest blank and the evaluation of the trailing edges is effected via 2D-sectional analyses in a purely geometric manner, for example via a length of sectional unrollings, possibly with heuristic correction factors. First, this is inaccurate, since the material extensions caused by the forming may not be taken into account or only in an inaccurate manner, and secondly it is incomplete since the sectional analyses may not be carried out at all locations along the component edges, or the handling of the existing CAD-tools, which are not fully mature, does not yet permit a complete analysis.

If one uses physical methods instead of purely geometrical ones, thus simulation, although the accuracy is increased, the examination however is then effected in a strict sequential manner and in different programs, thus after the addendum has been modified, and the simulation is set up, carried out and evaluated in a separate step. Every examination thus becomes a more time-consuming step due to this, which often leads to the fact that only the purely geometrically methods are applied instead of the accurate physical methods.

For this reason, methods are to be provided which simplify the working manner with a CAD-system for the preliminary design of forming parts and corresponding tools, and which improve the quality of the produced parts. The goal accuracy of the design is also to be improved, so that the effort is reduced with regard to the try-out.

BRIEF SUMMARY OF THE INVENTION

It is therefore the object of the invention to provide a method for determining a model of a geometry of a shaping stage in a computer-aided design system (CAD-system) of the initially mentioned type, which overcomes the above mentioned disadvantages. A corresponding data processing system, a computer program and a data carrier are also to be provided.

Thus, the following steps are carried out in the method for determining a geometry object for modelling a geometry of a forming stage in a computer-aided design (CAD) system:

defining a first geometry object which has a geometry model of the forming stage in a first condition;
defining an operator for describing a relation between the first geometry object and a second geometry object, which describes the forming stage in a second condition, wherein the operator has parameters for describing at least one forming step of the forming stage; and
automatic computation of the second geometry object from the first geometry object by way of carrying out an operator method, which determines or computes a geometry of the forming stage in the second condition on account of the geometry of the forming stage in the first condition, on account of the parameters of the at least one forming step, and on account of a physical simulation of the at least one forming step.

With this, an operator is then defined, which links a first geometry model to a second geometry model. A method for the physical modelling of a processing process is assigned to the linking, and this processing process transfers a forming stage from a corresponding first condition into a second condition. Given changes of the first geometry model, the second geometry model is automatically updated according to the physical modelling.

By way of this, the physical modelling of forming steps is integrated into the static geometric model world of a CAD-system. Thus geometry data does not need to be transferred from the CAD-system into a simulation system manually, just as one does not need to manually define forming parameters, and to possibly transfer geometry data resulting from the simulation back into the CAD system and to analyse this data in a manual manner. Instead of this, information is automatically computed from the geometry model of the second condition, and for example made accessible to an analysis within the framework of a CAD-system. By way of this, the effects of iterative modifications with which features of the first condition are changed, are visualised themselves in the CAD-system and/or are used in a further geometric modelling, without significant further user manipulation.

Thus, exact physical examination methods are provided for the relevant quantity features of the addendum, and these methods are coupled directly to the addendum in an associative manner. Thus, each change of the addendum therefore leads automatically and immediately to an updating of the quality criteria, and the effect of the change is immediately visible, and specifically based on the simulation method of a high accuracy, and not on approximative geometrical methods. A secured draw stage and other forming stages, and in particular their addendum, may be produced considerably more quickly and with a considerably greater accuracy. The results of this are not only a quicker development of the method plan, but also a significant reduction in the number of small and large try-out loops.

With regard to the term geometry object, the word "object" is to be understood as a computer science term, thus, as a unit of associated data which together describes one entity. A geometry object comprises a representation of a physical object or a feature of a physical object, for example a line, a surface or a body. It is essentially a geometric model description of a physical object which is computed when determining a geometry object.

Two geometry objects are assigned to one another in an associative manner by way of the operator, and are thus linked to one another in an associative manner. By way of the contained computation method, the operator for example defines a map between two points of the geometry models of the first and second condition.

The terms "first and second condition" relate to a sequence in the computation by way of the operator, in contrast to the sequence of the processing steps. Thus the "first" condition may correspond to a later processing condition than the "second" one, in the actual creation of the forming stage.

In a preferred embodiment of the invention, parameters which describe the forming according to the operator are also described, with which one takes into account the automatic updating of the second model by way of associative linking. The forming thereby consists of a single forming step or of a sequence of several forming steps, such as for example deep-drawing and/or drawing, reshaping, flanging, setting etc. Such parameters in particular are a geometry of the addendum, a geometry of tools of the forming step, as well as temperature, speed, lubrication, tool forces etc., of the forming.

Preferably, at least two operators are interlinked to one another in each case with corresponding operator methods (see the next section). This means that a second of the at least two operators is applied to the geometry of the forming stage determined by a first of the at least two operators. The first operator thus automatically computes a geometry in the second condition from the geometry in the first condition, and the second operator, from this, in turn automatically computes a geometry in a third condition. Further computations according to further interlinked operators are carried out in an analogous manner.

The computation method for the forming method allocated to the operator is called operator method for simplicity. In preferred variants of the invention, the operator method is one of the following methods:

a method for computing an edge line of a forming stage in an initial condition before a forming process, from a geometry of the edge line in a result condition after the forming process. Thereby, the edge line is preferably an edging of a sheet metal blank before the deep-drawing, and the result condition describes a drawing step after the deep-drawing, or the edge line is a trimming line, and the result condition describes a finished shaped forming stage, a method for the iterative evaluation of a trimming line from an edging of a finished shaped forming stage by way of repeated simulation. The edging in this case thus corresponds to the predefined course, a method for determining a course of a trailing edge, which is to say a delimitation line of a peripheral surface which comprises scratch lines or channels on account of the deep-drawing over a draw radius of a lower die and/or via a impact edge of a punch.

These methods are described in detail in the following. The methods may in principle in each case be applied without them being assigned to an operator in the above context. However, the integration into a CAD-system with an operator for associative linking of geometry objects is particularly advantageous.

The method for computing an edge line of a forming stage comprises the following steps:

generating a computing mesh, for example a finite element mesh or accordingly another discretisation method for describing a geometry of the forming stage in the result condition;

initialising condition parameters for a multitude of mesh elements and/or mesh nodes of the forming stage in the result condition;

mapping the computation mesh onto a geometry of the forming stage in the initial condition;

computing condition parameters changed according to the map, in the mapped mesh elements and/or mesh nodes (the mapped mesh elements and/or mesh nodes describe the initial condition of the forming stage);

determining a balanced computation mesh for the initial condition by way of displacing mesh elements and/or mesh nodes, until element forces of the mesh and external forces are at least approximately in equilibrium, for example corresponding to a condition of minimal energy;

extraction or computation of the edge line of the forming stage in the initial condition from the balanced computation mesh.

Concluding, thus firstly, a geometric mapping or unrolling is carried out, and then a compensating computation for taking the material and/or process properties into account. By way of this, it becomes possible to determine an edge line in an initial condition on account of the result condition in a single step, and whilst combining a geometric mapping method with a physically founded compensation computation. The accuracy of the evaluation is significantly increased compared to a purely geometric mapping or unrolling.

The condition parameters, thereby, preferably originate from at least one of the following categories of parameters: stresses, extensions, cutting forces, strength or hardening and sheet metal thickness. The initialisation in the result condition preferably corresponds to a normal condition of the material, in particular to a stress-free and extension-free condition. The mapping of the finite element mesh onto a geometry of the forming stage in the initial condition is preferably effected by way of a projection or by way of a geometric unrolling, thus without taking into account or simulating physical material properties. The physical material properties are only taken into account to a meaningfully limited extent by way of the preferably iterative compensation computation in the finite element mesh.

An initialisation according to the condition after the deep-drawing or after a further forming step, and in particular according to a strength or hardening and/or thickness after the deep-drawing is preferably effected before the compensation of the mesh. By way of this, the condition parameters which are changed on account of the deep-drawing and which deviate from the normal condition or the initial condition of the material are taken into account in the compensation computation. The physical compensation computation takes place under conditions which even if not accurate, are at least closer to the actual material condition than the normal condition. The accuracy of the computation is increased with this. By way of the fact that the method proceeds from the desired result, computes backwards and at the same time simulates only a single concluding, fictive forming step, it is very quick in comparison to a complete forward simulation of all forming steps. By way of this, the variants described in the following are quick and efficient, and lead to information which may be represented immediately after changes of the addendum or other initial data.

The unrolling and the compensation may also be carried out by way of the geometry of an intermediate step between the condition of the forming stage in the initial and result condition, in order to increase the accuracy. Thereby, firstly one unrolls to an intermediate condition, the compensation is carried out in this condition, and then one further unrolls to the initial condition, and here the compensation computation is carried out once again. Several intermediate steps are possible in an analogous manner.

Preferably, an assessment of the forming ability of the forming stage by the forming process is carried out by way of the compensated computation mesh. This, for example, means that one examines automatically as to whether a sheet metal thinning is not too great, whether cracks or wrinkles occur, or whether the sheet metal would tear on account of the forming.

If in a first preferred variant of the method for computing an edge line of a forming stage, the forming process is a deep-drawing process, the initial condition describes a sheet metal blank before the deep-drawing, the edge line in the initial condition is an edging of the sheet metal blank, and the result condition describes a draw stage after the deep-drawing or after the further forming step.

By way of this, it is possible to conclude the minimal sheet metal size before deep-drawing from a necessary minimal sheet metal size after the deep-drawing. The influence of the addendum on the blank size and thus on the material costs may be estimated by way of this. With the integration into a CAD-system via an associative operator, the influence of a change of the addendum on the material costs in the CAD-model may be computed directly during the preliminary design and without further complicated intervention on the part of the user. The influence may thus be rendered visible in a simple manner, and/or the changed part geometry may be used in a further geometric modelling.

In a second preferred variant of the method for computing an edge line of a forming stage, the forming process has a sequence of individual forming steps, the initial condition describes the forming stage after a trimming operation, the edge line in the initial condition is a trimming line, and the result condition describes a finished shaped forming stage.

By way of this, it is possible, proceeding from a desired edge line in the end product, thus from the edge or from the corner of the finished shaped forming stage, to determine the trimming line on the deep-draw stage (or a later stage) which leads to the desired edge line, in one step. Of course, one may, in an analogous manner, also proceed from a desired edge line on an intermediate stage which does not yet correspond to the end product. The "end product" in the context of the above description does not necessarily need to be the product of the last processing step.

Characteristic properties of the trimming line in the initial condition are automatically determined and assessed, in particular a shear angle and/or a cutting angle and/or cutting bench properties. If these properties do not lie within predefined limits, this is preferably displayed by way of a suitable visual marking, for example, coloring of the trimming line. Such a visual representation of properties of the trimming line are preferably superimposed on a visual representation of the forming stage. Thereby, a complete section of the trimming line is computed and represented with a high resolution. This is in contrast to known methods with which only a few individual sectional planes transverse to the trimming line are observed, and with which only a single point of the trimming line may be determined for each sectional plane.

The method for the iterative evaluation of a trimming line from an edging of a finished shaped forming stage carries out a physical simulation, in particular based on a method of finite elements, with which a hypothetical course of the edging is computed from a hypothetical course of the trimming line. The hypothetical course of the trimming line is iteratively adapted with a repeated implementation of the physical simulation, until the hypothetical course of the edging has approximated the predefined course up to a given tolerance. For example, with a deviation of edge points from the defined course, the corresponding edge points of the trimming line are displaced by an amount which is in each case proportional to the deviation. Although this iterative method, with regard to effort and time, is more extensive than the above described single-step method with the integration into a CAD-system via an associated operator, it is however transparent to the user and may be applied without further manual effort. The result may be visualised or may be used in a further geometric modelling.

In a preferred variant of the invention, trimming operations are carried out on several forming stages. Here too, proceeding from a first preliminary design, the position of the trimming lines on the different forming stages is determined and iteratively corrected. Thus several trimming operations are carried out on in each case different forming stages of the same sheet metal blank, and also simulated according to the invention. In each case, for one of several different sections of the trimming line, at the same time the initial condition for this section in each case corresponds to the sheet metal blank after the different forming step.

The method for determining a course of a trailing edge simulates a deep-drawing operation, by which means an associated point on the forming stage is computed after the deep-drawing, for each of a quantity of materially fixed points on a defined line on the forming stage before deep-drawing, and the entirety of these associated points describes the trailing edge.

The predefined line on the forming stage is preferably computed by way of projecting a tool geometry onto the forming stage before the deep-drawing as a so-called punch opening line. Alternatively, the predefined line on the forming stage is computed as a line with a constant distance to an inner binder edge after the binder is closed and before the deep-drawing.

By way of this, it becomes possible to determine an approximate course of the trailing edge without a complicated separate simulation. A computation and immediate visualisation of the trailing edge in the CAD-model is possible during the preliminary design, as well as a use of the computed trailing edge in a further geometric modelling, with the integration into a CAD-system by way of an associative operator.

One preferably not only computes the map of the mentioned points on the predefined line, but the mapping of all points of the complete sheet metal (part) or only in a predefined region between, for example, the punch opening line and the inner binder edge, or between the punch opening line and the outer sheet metal edging before the deep-drawing. With this, a bijective map between points of the sheet metal surface or of the sheet metal body is determined before and after the deep-drawing. The description of the points before and after the deep-drawing is contained in the first and second geometry object. The bijective map is thus a result of the operator method or of the operator.

In a preferred variant of the invention, the evaluation of the trailing edge is combined with one of the methods for determining a trimming line.

By way of this, it becomes possible to compare the geometry of the trailing edge with that of the trimming line. As long as the trailing edge runs on the draw stage outside the trimming line, no scratches or channels are visible on the completed formed part. One may also define a safety distance between the trimming line and the trailing edge, which must be observed. Or, depending on the type of product, one may also specify a tolerance region according to a so-called visibility limit, in which the trailing edge may be located within the trimming line. In any case, in a graphic or visual representation of the forming stage, one marks, for example by way of a suitable colouring of a course of the trimming line and/or the trailing edge, whether the demands on the course of the trailing edge are fulfilled.

The data processing system for determining a model of a geometry of a forming stage in a computer-aided design (CAD) system contains memory means with computer program code means stored therein, which describe a computer program, and data processing means for carrying out the computer program, wherein the implementation of the computer program leads to the implementation of the method according to the invention.

The computer program for determining a model of a geometry of a forming stage in a computer-aided design (CAD) system according to the invention may be loaded into an internal memory of a digital data processing unit, and comprises computer program code means which, when they are carried out in a digital data processing unit, cause this to implement the method according to the invention. In a preferred embodiment of the invention, a computer program product comprises a computer-readable medium on which the computer program code means are stored.

BRIEF DESCRIPTION OF THE DRAWINGS

The subject-matter of the invention is explained hereinafter in more detail by way of preferred embodiment examples which are represented in the attached drawings. In each case and in a schematic manner there are shown in.

The reference numerals used in the drawings and their significance are listed in a grouped manner in the list of reference numerals. Basically, the same parts are provided with the same reference numerals in the figures.

DETAILED DESCRIPTION OF THE INVENTION

Figure 1:
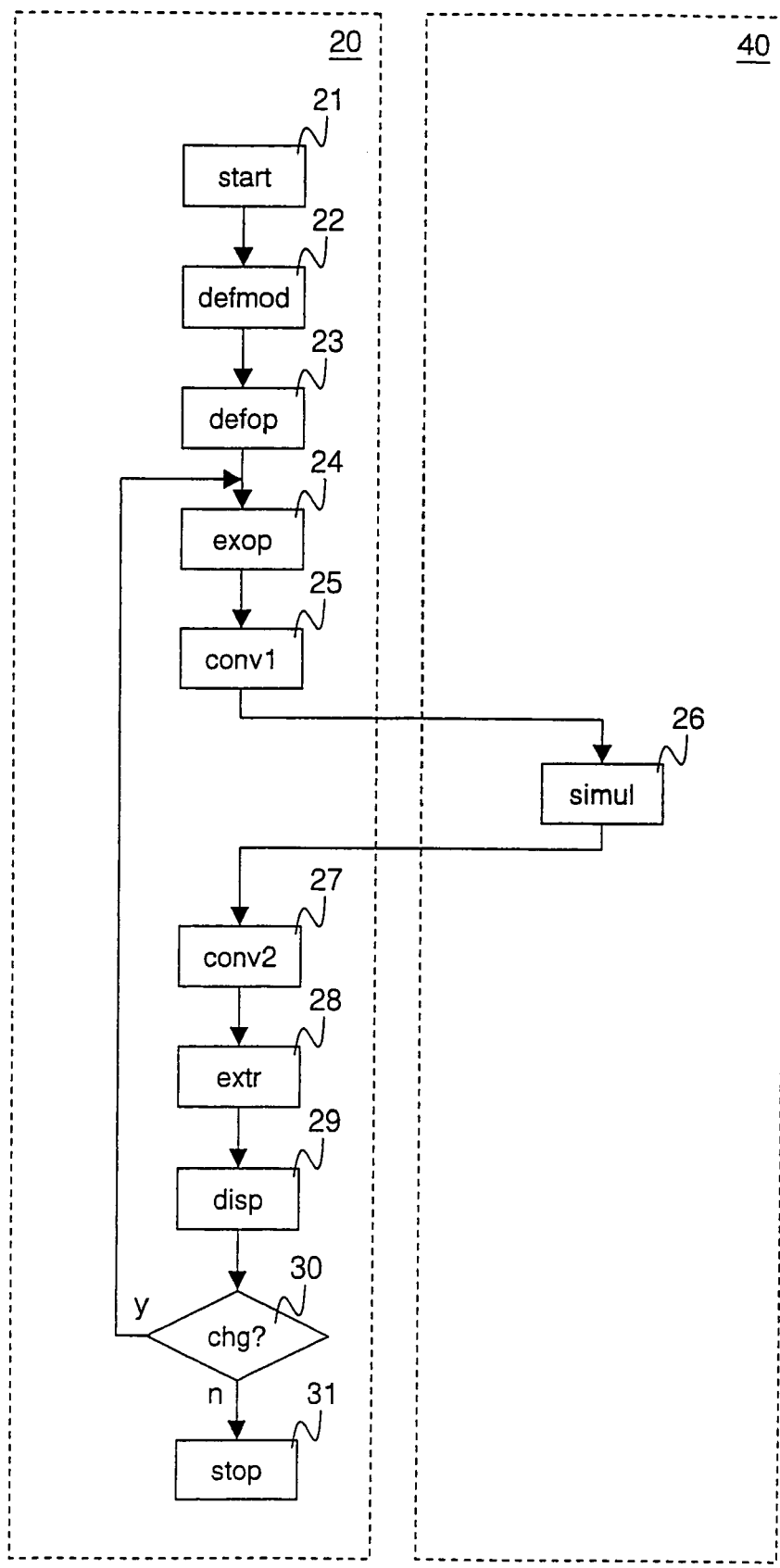
FIG. 1 a procedural course of a method according to the invention.

FIG. 1 shows a procedural course of a method according to the invention. The method runs in a CAD-system 20 for the design of a geometry of forming stages. The method uses functions of a physical simulation system 40 which are either integrated into the CAD-system 20 or are made available via a program interface by way of the physical simulation system 40. A step for model production of a geometry object 22 is carried out after the start 21 of the method within the CAD-system 20. Thereby, the model, for example in the working memory region of a computer, is produced by way of user inputs or by way of stored model data, so that it may be processed by the CAD-system 20. In a step for the definition of an operator 23, the operator which sets the geometry objects in a relationship to one another, is manually defined or is read from a stored model description. The operator may, for example, be written as f, wherein $$G_2 = f(G_1, P),$$

wherein $G_1$ indicates a first, and $G_2$ a second geometry object, and P, parameters of the operator, thus a description of one or more corresponding processing steps. A computation method for the forming method allocated to the operator is called operator method for simplicity. The operator method is carried out with an application of an operator 24, wherein a physical simulation 26 is also carried out. For this, firstly a computation mesh, in particular a finite element mesh is produced in a first conversion step 25 from a CAD-model of the first geometry object. This is modified by the simulation 26 whilst taking into account physical material properties of a sheet metal blank 1 as well as process properties corresponding to one or more physical processing steps. The simulation may also include several iteratively implemented individual simulations. The modified finite element mesh, if required, is converted into a display which is accessible to the CAD system 20 in a second conversion 27. The features which are of relevance to the operator concerned are extracted in the model in a step for the extraction of relevant features 28. Optionally, this step 28 may happen also before the second conversion 27. The relevant features are represented in a visualisation in a display 29, for example in a certain processing stage and are superimposed for example on a representation of the formed sheet metal blank 1. They may of course also be used in further steps of the geometric modelling.

With regard to computer technology, the operator is implemented by a data structure or a software object in the context of object orientated programming, which for example represents indicators to the linked geometry objects, and properties of the one or more processing steps. In the step "waiting for changes" 30, a monitoring routine of the CAD-system 20 controls whether changes have occurred in the first geometry object or in the parameters, and triggers a new computation corresponding to the operator method. As long as the observed geometry objects in the CAD-system 20 are processed, the method is in the waiting condition 30 or in the new computation 24-28. The method is completed 31 on completion of the processing.

Figure 2:
FIGS. 2 to 8 different processing stages of a forming process.
Figure 3:
Figure 4:
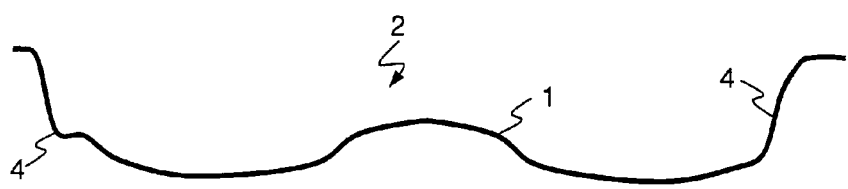
Figure 5:
Figure 6:
Figure 7:

FIGS. 2 to 8 show different processing stages of a forming process, in each case in a cross section. FIG. 2 shows a sheet metal part, also called blank 1, in the flat initial condition. FIG. 3 shows the course of the sheet metal blank 1 after clamping between a lower die 11 and a binder 10 of a deep-drawing press. After the drawing by way of a punch which has not been shown, the sheet metal blank 1 has the shape according to FIG. 4, also called draw stage. The draw stage comprises a so-called addendum 4 which is later cut away, but which indeed influences the material properties in the end product. FIG. 5 shows the sheet metal blank 1 after a trimming operation, which is carried out along a trimming line 3, and wherein an edge of the sheet metal blank 1 is formed. FIG. 6 shows the sheet metal blank 1 after the reshaping, wherein individual shapes are shaped to a greater extent. FIG. 7 shows the sheet metal blank 1 after the flanging of flanges 5, in FIG. 8 after the setting of the flange 5.

Other cross sections through the sheet metal blank 1 (for example from above to below and perpendicular to the plane of the drawing) are mannered similarly to those shown. The shown processing sequence is simplified by way of example. Further processing steps of a similar manner may be added, in order to fashion individual detail shapes, for example openings. One may also carry out several trimming operations, for example, after the reshaping.

Figure 8:
Figure 9:
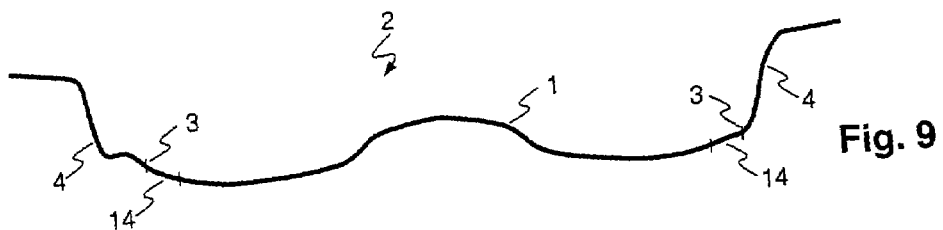
FIG. 9 a deep-draw stage with flange regions mapped thereon.

FIG. 9 shows a deep-draw stage with flange regions 14 mapped thereon. With this, an unrolling of the trimming line 3 from the end condition according to FIG. 8 to the draw stage 2 is illustrated. The unrolling may be carried out in a single step or via one or more intermediate stages.

Figure 10:
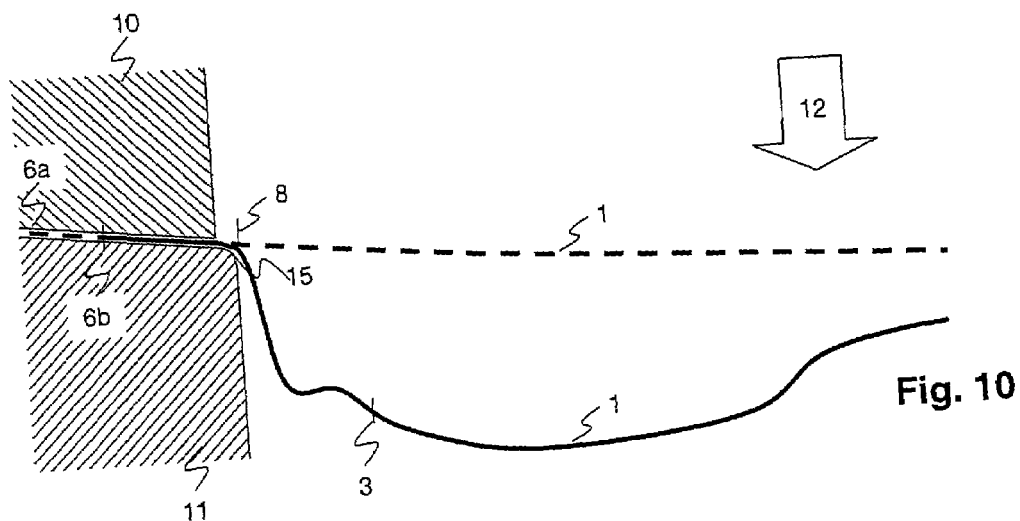
FIG. 10 a detailed view of a blank before and after the deep-drawing.
Figure 11:
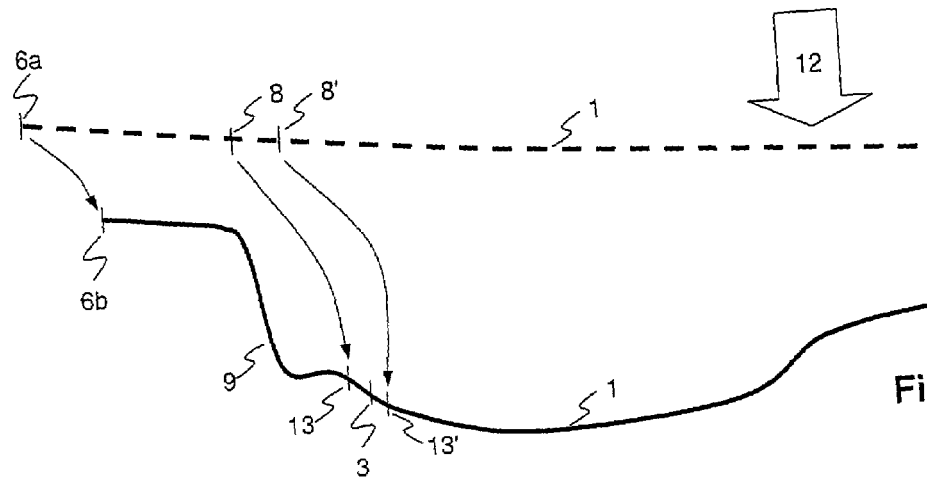
FIG. 11 a shifting of certain material points from this detailed view.

FIG. 10 shows a schematic detailed view of a blank before and after the deep-drawing. The figure is schematic in the sense that in reality the sheet metal blank 1 is held between the binder 10 and the lower die 11, and is pulled tightly over a drawing radius 15 of the lower die 11. Additionally shown is a sheet metal edging line before the deep-drawing 6a, a sheet metal edging line after the deep-drawing 6b, a punch opening line 8 and a punch direction 12, thus the movement direction of the punch which is not shown. FIG. 11 shows a displacement of certain material points of this detailed view, and a region a channels 9 which arises on the sheet metal blank 1 by way of the deep-drawing.

Preferred operator methods are now described in the following.

Exact Unrolling of the Trimming Line and Feasibility of the Flange.

A physical unrolling is effected by way of inverse single-step simulation, instead of a normal geometric unrolling in individual steps perpendicular to the edge line.

This method is applied for the forming operation for producing the flange 5. It may be integrated into the CAD-process as a physical operator of the associativity, said operator combining the component edge line unrolled onto the addendum, with the addendum. The method constitutes a reliable analysis means for assessing the manufacturability of the flange 5 by way of this, said analysis or its results preferably likewise being associatively linked to the addendum.

Thereby, the following steps are carried out, see also FIGS. 8 and 9 for this, which show the finished formed component and the draw stage 2.

a) Generating the finite element mesh as a computation mesh on the component with intermediately or finished formed flanges 5.
b) Mapping this mesh onto the geometry of the draw stage 2 before the forming of the flange 5. This mesh represents the start solution for the equilibrium iteration d). For example, a projection in the punch direction, geometric unrollings or rotary projection algorithms may be used as a mapping function.
c) Initialising extensions and stresses in the component mesh; either to zero in the cases that the extensions and stresses caused by the forming of the draw stage are not to be taken into account, or initialisation to the extensions and stress values and/or hardening or strength and sheet metal thickness of the draw stage 2 in the start solution.
d) Iteration of the equilibrium by way of the inverse finite element method in the draw stage. Thereby, the mesh nodes are iteratively shifted along the draw stage until the element forces in the nodes are in equilibrium. With this, thus the equilibrium in the initial position of the forming (thus on the draw stage) is iterated, i.e. one searches for that node position in the initial condition which leads to an equilibrium condition in the predefined end condition (component mesh). E.g. an elastic, rigid-plastic or however a more accurate elasto-plastic law may be approximately applied as a material law.
e) Possible re-iteration of the initialisation of the extensions and stresses, in the case that the extensions and stresses have been taken into account in the draw stage. This is necessary since the initial mesh has shifted, and, thus, other initial extensions and stresses may be present at a certain material point. The re-initialisation may also be effected simultaneously with the equilibrium iteration.

Instead of the stresses and extensions, one may also use the cutting forces in an analogous manner.

The result is the final iterated mesh in the draw stage: its edge represents the flange edging 3 unrolled onto the draw stage 2. The evaluated extensions in the draw stage 2 may be inverted and then represent the extensions in the component 1 which have arisen by way of the flanging. With this, without further working steps, with each change of the draw stage geometry, in particular its addendum 4, in each case the resulting unrolled component edging 3, thus the position of the trimming line 3 is visible on the addendum 4, and simultaneously also the extensions and stresses (as well as variables derived therefrom), caused by the forming of the flange 5 is visible in the flanges 5, and this allows one to recognise whether a flange 5 may be formed at all.

The advantages of the method are: a greatly accelerated development of an addendum 4 which is optimal with respect to following flange operations. The method also forms a basis for the analysis of a feasibility of the trimming line, as is described further below; and leads to less required try-out iterations.

Smallest Possible Blank/Forming Ability and Component Quality

The evaluation of a smallest possible blank by way of inverse single-step simulation permits the estimation of the material costs, and results in a starting blank for the simulation of the forming process as well as for the try-out.

The evaluation of the smallest possible blank edging may be linked associatively to the addendum or to the geometry of the drawing operation. By way of this, it may be integrated into the CAD-process by way of a physical operator of the associativity. It is simultaneously also a reliable analysis means for assessing the feasibility of the drawing operation, wherein a representation of the analysis is likewise associatively linked to the addendum or the draw stage.

One possible embodiment of the method for determining the smallest possible blank edging is based on the situations according to FIG. 10. The method is basically analogous to the above described method for determining the trimming line. Instead of the shifting of the trimming line over different forming steps, a shifting of the blank edging on deep-drawing is considered. This results in the following steps for the simulation of the drawing operation with inverse single-step simulation:

a) Setting the desired sheet metal edging 6b after the drawing operation on the drawing tool. This edging line 6b may also be automatically produced, e.g. as a line with a constant offset to the punch opening line.
b) Interlinking the drawing geometry edged by this line.
c) Initialising the extensions and stresses or cutting forces in this mesh to zero.
d) Evaluating a start solution for equilibrium iteration in the initial sheet metal plane, e.g. by way of projection.
e) Iteration of the equilibrium with the inverse finite-element method in the plane, initial sheet metal.

In each case, one may also take into account constraints such as retaining forces in particular binder forces, in the above steps.

This simulation may alternatively also be effected in several steps, e.g. in a first step from the draw geometry back to the binder surface, and then in a second step back to the initial sheet metal.

The result is the necessary edging 6a of the plane initial sheet metal 1 which after the drawing operation leads to the defined sheet metal edging 6b. The extensions and stresses may be simultaneously evaluated—these then permit an estimation of the forming ability/component quality for the drawing operation, which is associatively linked to the CAD-design. Each change of the addendum (or also component) immediately results in a new minimal blank and in a visualisation of the forming ability. The material costs may also be estimated from the size of the minimal blank. Thus the influence of a change in the draw stage geometry, in particular of the addendum 4, on the material costs is immediately evident, which greatly simplifies the optimisation of the addendum 4 with regard to the material costs.

Feasibility of the Trim, Evaluation of the Optimal Trimming Direction

With this, characteristic properties of the trimming line in the initial condition are automatically evaluated and assessed. This includes an assessment of the trimming line and the cutting bench with regard to feasibility (cutting angle and shear angle, width and flatness of the cutting bench), and an evaluation of the trimming direction.

The evaluation and assessment of the cutting angle properties and cutting bench properties are preferably associatively linked to the addendum. A representation of the cutting angle along the trimming line 3 is preferably effected via colours, so that full information along the trimming line is present, not only a pointwise analysis in individual points. The assessment is preferably effected not only on the trimming line itself, but via a belt running on both sides of the trimming line in the sheet metal blank 1, a so-called cutting bench. An automatic evaluation of the optimal cutting direction or an automatic allocation of a working direction may additionally take place on regions of the trimming lines.

One possible embodiment is: The unrolled sectional line on the addendum may be assessed with regard to cutting angle and shear angle after each change in the draw stage geometry or in the addendum, and be represented immediately in coloured manner. For this, one must previously define from which angle the trimming lines 3 or regions of the trimming lines 3 are to be cut; this is preferably the main working direction of one of the forming operations, but may however also be lateral directions (with cam trimmings). Alternatively, one may determine the optimal cutting direction for given regions of trimming lines 3 by way of independently selecting a cutting direction which fulfil the assessment criteria on all selected regions of the trimming lines 3, or by way of representing the possible angular range for the working direction in a diagram, and the user selecting a working direction with the help of this diagram or a graphic display. Furthermore, the possibility also exists of allocating trimming line regions automatically to one of a given quantity of working directions and/or cam directions, so that the assessment criteria are fulfilled.

The flanges 5 to be formed in the subsequent operations are unrolled onto the addendum, in order to obtain the trimming lines 3. The trimming lines 3 are examined with regard to feasibility:

The cutting angle should be smaller than a predefined limit, e.g. 15 degrees. The cutting angle characterises the slant of the arising section surface at the end face and is e.g. defined as follows: the cutting angle is enclosed by the surface normal on the section curve and the projection of the cutting direction onto the normal plane of the section curve.

The shear angle should be smaller than a predefined limit, e.g. 80 degrees

The shear angle characterises the slant of the knife engagement and is e.g. defined as follows. The shear angle is enclosed by the surface normal on the cutting curve and the projection of the cutting direction onto the plane which is formed by the surface normal and the tangential vector to the cutting line.

The width of the cutting benches: the cuts of the geometry in planes which are perpendicular to the cutting line should be adequately flat in a margin along the cutting line 3, said margin being 5 mm wide on both sides. For this e.g., the maximum radius of curvature of these sections in the margin may be determined. This margin must then be greater than a limit, e.g. larger than 20 mm. The reason for this is the necessity of a "clean" contact surface for the holding tools, a minimal width or minimal strength of holding tools and cutting knife, or a "reserve" in the case that surfaces bordering the cutting benches must be changed during the try-out.

An iterative change/adaptation of the intermediate stage, in particular of the addendum 4 is effected when these criteria are not fulfilled.

The procedure according to the FIGS. 2 to 8 corresponds to a very simple process. Trimming operations are, for example, often carried out on several forming stages. Different sections of the final edge line, thus, originate from trimmings of different forming stages of the same sheet metal. Here too, proceeding from a first preliminary design, the position of the trimming lines on the various forming stages are determined and iteratively corrected.

The combined simulation of the consecutive processing steps results in a current component edge in the end condition which depending on the progress of the iteration lies close to the desired predefined component edge. With this, in the end condition, a point of the desired predefined component edge and a corresponding deviation may be allocated to each material point of the current component edge. With this, a deviation distribution along the component edge in the end condition and, over a rearward mapping with the help of the material points, is defined in the preceding forming stages. This deviation distribution is then used in order to iteratively correct or adapt a section of the trimming line in a trimming operation on a preceding forming stage in which the corresponding section of the component edge is produced, with the aim of the simulation of the consecutive machining steps following in the iteration, whilst using this new trimming line in the end condition, and providing a corresponding section of the component edge which lies closer to the desired defined component edge. This iterative simulation of the consecutive processing steps is carried out until the deviation in the end condition, between the component edge resulting from the simulation, and the predefined component edge, falls short of a predefined tolerance for all edge sections produced in the different forming stages.

Trailing Edges

Trailing edges arise when the sheet metal flows over the draw radius 15. The draw radius 15 is an inner edge of the lower die 11 over which the sheet metal blank 1 is pulled. The inner edging of all material points which have flowed over the draw radius 12 is indicated as the trailing edge 13. Channels or a region with surface scratches or channels 9 are formed between the trailing edge 13 and the draw radius 15. These channels, after the drawing operation, may not come to lie in a visible region of the finished component. Channels and accordingly also a trailing edge arise analogously also on the other side of the sheet metal, in that the sheet metal 1 is drawn over a so-called impacting edge of the punch.

The evaluation of the trailing edges 13 is effected preferably by way of a simulation, wherein this evaluation is fixedly integrated into the CAD-process. Thereby, an associative connection of the trailing edge 13 to the addendum 4 is carried out via a physical associativity operator. A change of the trailing edge 13 at the same time is immediately visible with each change of the addendum 4; and an addendum 4 which is optimal with respect to this may be produced considerably more quickly and reliably.

One possible embodiment based on the conditions according to FIG. 11: the drawing operation is simulated, for example with a single or two consecutive single-step methods (forwards or backwards; an incremental method would also be possible). Thereby, with the use of two steps, the sheet metal shape as an intermediate geometry should be present after closure of the binder, as in FIG. 3, as well as the formed geometry at the end of the drawing operation. A bijective mapping between these two geometries is present by way of the materially fixed points. The material points which lie at the beginning of the draw radius after the closure of the binder or are defined in a similar manner, form the trailing edge in the geometry at the end of the drawing operation.

For evaluating the trailing edge 12, one proceeds from a projection of the punch opening line 8 onto the forming stage before the deep-drawing. The punch opening line 8 is essentially a section of an extension of a perpendicular surface of the lower die 11 with the sheet metal blank 1. By way of the simulation, one determines where the points of the punch opening line 8 come to lie on the draw stage 2. These points are observed as a trailing edge 13. In another variant of the invention, one proceeds from a line 8' which is located at a constant distance within the punch opening line 8. A second trailing edge 13' results from this. In the shown example, the second trailing edge 13' lies within the trimming line 3. This is allowable or not, depending on the demands on the part. In a further variant, one assumes a line with a constant distance to an inner binder with a clamped forming part before the deep-drawing.

LIST OF REFERENCE NUMERALS 1 sheet metal blank
2 draw stage
3 trimming line
4 addendum
5 flange
7 sheet metal edging line
6a sheet metal edging line before the deep-drawing
6b sheet metal edging line after the deep-drawing
8 punch opening line
9 region with channels
10 binder
11 lower die
12 punch direction
13 trailing edge
14 unrolled flange
15 draw radius
20 CAD-system
21 start
22 model production from the geometry object, defmod
23 definition of an operator, defop
24 application of an operator, exop
25 first conversion, conv 1
26 physical simulation, simul
27 second conversion, conv2
28 extraction of relevant features, extr
29 display, disp
30 waiting for changes, chg?
31 stop
40 physical simulation system

The invention claimed is:

1. A method for determining a model of a geometry of a forming stage (1) in a computer-aided design (CAD)-system, comprising the following steps:
defining a first geometry object, which comprises a geometry model of the forming stage (1) in a first condition;
defining an operator for describing a relation between the first geometry object and a second geometry object, which describes the forming stage in a second condition, wherein the operator comprises parameters for describing at least one forming step of the forming stage (1);
computing the second geometry object from the first geometry object by way of carrying out an operator method, which by way of the geometry of the forming stage (1) in the first condition, by way of the parameters of the at least one forming step, and by way of a physical simulation of the at least one forming step, determines a geometry of the forming stage (1) in the second condition; and
producing a computer model in the working memory region of the CAD-system computer corresponding to the forming stage in the second condition;
wherein the operator method computes an edge line of a forming stage in an initial condition before a forming process, from the geometry of the edge line (3) in a result condition after the forming process, and the operator method comprises the following sequential steps:
generating a computation mesh, for describing a geometry of the forming stage in the result condition;
initialising condition parameters for at least one of a multitude of mesh elements and mesh nodes of the forming stage (1) in the result condition;
mapping the computation mesh onto a geometry of the forming stage (1) in the initial condition;
computing condition parameters changed according to the mapping, in the mapped mesh elements and/or mesh nodes;
determining a balanced computation mesh for the initial condition by way of shifting mesh elements or mesh nodes, until element forces of the mesh and external forces are at least approximately in equilibrium; and
extraction of the edge line (3) of the forming stage (1) in the initial condition from the balanced computation mesh.

2. A method according to claim 1, wherein the second geometry object is automatically computed or adapted afresh with a change in the parameters for describing at least one forming step.

3. A method according to claim 1, wherein at least two operators are defined in each case with corresponding operator methods, and that the operators are interlinked, which means that a second of the at least two operators is applied to the geometry of the forming stage (1) which is determined by a first of the at least two operators.

4. A method according to claim 3, wherein the operator method carries out a computation of a trimming line (3) as a second geometry object from an edging of a finished shaped forming stage (1) as a predefined course as a first geometry object, by carrying out a physical simulation, with which a hypothetical course of the edging is computed from a hypothetical course of the trimming line, and the hypothetical course of the trimming line (3) with a repeated implementation of the physical simulation is automatically and iteratively adapted, until the hypothetical course of the edging has approximated the predefined course up to a predefined tolerance.

5. A method according to claim 4, wherein several trimming operations are simulated on in each case different forming stages of a same sheet metal blank (1), and that in this manner, for several different sections of the trimming line, an initial condition for in each case one of these sections in each case corresponds to the sheet metal blank (1) after a different forming step.

6. A method according to claim 3, wherein the operator method determines a course of a trailing edge (13), in that a deep-drawing operation is simulated, by which means an associated point on the forming stage (1) after the deep-drawing is computed for each of a quantity of materially fixed points on a predefined line (8, 8') on the forming stage (1) before the deep-drawing, and the entirety of these associated points describes the trailing edge (13, 13').

7. A method according to claim 6, wherein a course of the trimming line (3) on the forming stage (1) is compared to a course of an automatically evaluated trailing edge (13, 13').

8. A method for determining a model of a geometry of a forming stage (1) in a computer-aided design (CAD)-system, comprising, for computing an edge line (3) of a forming stage (1) in an initial condition before a forming process from the geometry of the edge line (3) in a result condition after the forming process, wherein the forming stage (1) is a deep-draw stage, or the forming stage (1) is a subsequent stage after a deep draw stage, the following sequential steps:

generating a computation mesh, for describing a geometry of the forming stage in the result condition;

initialising condition parameters for at least one of a multitude of mesh elements and mesh nodes of the forming stage (1) in the result condition;

mapping the computation mesh onto a geometry of the forming stage (1) in the initial condition;

computing condition parameters changed according to the mapping, in the mapped mesh elements and/or mesh nodes;

determining a balanced computation mesh for the initial condition by way of shifting mesh elements or mesh nodes, until element forces of the mesh and external forces are at least approximately in equilibrium; and extracting the edge line (3) of the forming stage (1) in the initial condition from the balanced computation mesh.

9. The method according to claim 8, comprising executing the sequence of steps of claim 8 at least twice, using at least one of the initial condition and/or the edge line determined in the first execution as the result condition for the second execution.

10. A method according to claim 8, wherein the condition parameters originate from at least one of the following categories of parameters: stress, extension, cutting forces, hardening or strength, sheet metal thickness.

11. A method according to claim 8, wherein the initialisation in the result condition corresponds to a stress-free and extension-free condition.

12. A method according to claim 8, wherein the initialising step corresponds to at least one of a strength and a thickness in the result condition and is effected before balancing the mesh.

13. A method according to claim 8, wherein an assessment of the forming ability of the forming stage (1) by the forming process is carried out by way of the balanced computation mesh.

14. A method according to claim 8, wherein the forming process is a deep-drawing process, the initial condition describes a sheet metal blank before the deep-drawing, the edge line in the initial condition is an edging (6a) of the sheet metal blank, and the result condition describes a draw stage after the deep-drawing.

15. A method according to claim 8, wherein the forming process comprises a sequence of individual forming steps, the initial condition describes the forming stage (1) after a trimming operation, the edge line in the initial condition is a trimming line (3), and the result condition describes a finished shaped forming stage (1).

16. A method according to claim 15, wherein characteristic properties of the trimming line in the initial condition are automatically determined and assessed, in particular at least one of a shear angle and a cutting angle and cutting bench properties.

17. A method according to claim 16, wherein a visual display of properties of a complete section of the trimming line (3) is superimposed on a visual display of the forming stage (1).

18. A data processing system for determining a model of a geometry of forming stage in a computer-aided design (CAD)-system, wherein the data processing system comprises means for carrying out the following steps:

defining an operator for describing a relation between the first geometry object and a second geometry object, which describes the forming stage in a second condition, wherein the operator comprises parameters for describing at least one forming step of the forming stage (1);

computing the second geometry object from the first geometry object by way of carrying out an operator method, which by way of the geometry of the forming stage (1) in the first condition, by way of the parameters of the at least one forming step, and by way of a physical simulation of the at least one forming step, determines a geometry of the forming stage (1) in the second condition; and producing a computer model in the working memory region of the CAD-system computer corresponding to the forming stage in the second condition, wherein the operator method computes an edge line of the forming stage in the first condition before a forming process, from the geometry of the edge line (3) in the second condition after the forming process, and the operator method comprises the following sequential steps:

generating a computation mesh, for describing a geometry of the forming stage in the second condition;

initialising condition parameters for at least one of a multitude of mesh elements and mesh nodes of the forming stage (1) in the second condition;

mapping the computation mesh onto a geometry of the forming stage (1) in the first condition;

computing condition parameters changed according to the mapping, in the mapped mesh elements and/or mesh nodes;

determining a balanced computation mesh for the first condition by way of shifting mesh elements or mesh nodes, until element forces of the mesh and external forces are at least approximately in equilibrium;

extraction of the edge line (3) of the forming stage (1) in the first condition from the balanced computation mesh.

19. A computer-readable medium on which a computer program code is stored, the computer program being for determining a model of a geometry of a forming stage in a computer-aided design (CAD) system, and which is loaded onto and carried out in a data processing unit, and which on execution, carries out the following method steps:

defining an operator for describing a relation between the first geometry object and a second geometry object, which describes the forming stage in a second condition, wherein the operator comprises parameters for describing at least one forming step of the forming stage (1);

computing the second geometry object from the first geometry object by way of carrying out an operator method, which by way of the geometry of the forming stage (1) in the first condition, by way of the parameters of the at least one forming step, and by way of a physical simulation of the at least one forming step, determines a geometry of the forming stage (1) in the second condition; and producing a computer model in the working memory region of the CAD-system computer corresponding to the forming stage in the second condition wherein the operator method computes an edge line of the forming stage in the first condition before a forming process, from the geometry of the edge line (3) in the second condition after the forming process, and the operator method comprises the following sequential steps:

generating a computation mesh, for describing a geometry of the forming stage in the second condition;

initialising condition parameters for at least one of a multitude of mesh elements and mesh nodes of the forming stage (1) in the second condition;

mapping the computation mesh onto a geometry of the forming stage (1) in the first condition;

computing condition parameters changed according to the mapping, in the mapped mesh elements and/or mesh nodes;

determining a balanced computation mesh for the first condition by way of shifting mesh elements or mesh nodes, until element forces of the mesh and external forces are at least approximately in equilibrium;

extraction of the edge line (3) of the forming stage (1) in the first condition from the balanced computation mesh.

20. A computer readable medium on which a computer program code is stored, the computer program being for determining a model of a geometry of a forming stage in a computer-aided design (CAD)-system, and which may be loaded onto and carried out in a data processing unit, and which on execution carries out the following method steps sequentially:

generating a computation mesh, for describing a geometry of a deep draw forming stage in the result condition;

initialising condition parameters for at least one of a multitude of mesh elements and mesh nodes of the forming stage (1) in the result condition;

mapping the computation mesh onto a geometry of the deep draw forming stage (1) in the initial condition;

computing condition parameters changed according to the mapping, in the mapped mesh elements and/or mesh nodes;

determining a balanced computation mesh for the initial condition by way of shifting mesh elements or mesh nodes, until element forces of the mesh and external forces are at least approximately in equilibrium; and extracting the edge line (3) of the deep draw forming stage (1) in the initial condition from the balanced computation mesh.

* * * * *